US012789391B2

(12) United States Patent
Furuyama

(10) Patent No.: US 12,789,391 B2
(45) Date of Patent: Nov. 10, 2026

(54) MOBILE BODY AND POSITIONING CONTROL METHOD

(71) Applicant: SONY GROUP CORPORATION, Tokyo (JP)

(72) Inventor: Yoshikazu Furuyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 30 days.

(21) Appl. No.: 18/713,338

(22) PCT Filed: Nov. 17, 2022

(86) PCT No.: PCT/JP2022/042663

§ 371 (c)(1),
(2) Date: May 24, 2024

(87) PCT Pub. No.: WO2023/100666

PCT Pub. Date: Jun. 8, 2023

(65) Prior Publication Data

US 2026/0115935 A1 Apr. 30, 2026

(30) Foreign Application Priority Data

Dec. 1, 2021 (JP) ................................ 2021-195416

(51) Int. Cl.
*B25J 13/08* (2006.01)
*B25J 5/00* (2006.01)
(Continued)

(52) U.S. Cl.
CPC ............ *B25J 13/086* (2013.01); *B25J 5/007* (2013.01); *B25J 9/1612* (2013.01); *B25J 15/08* (2013.01); *B25J 19/023* (2013.01)

(58) Field of Classification Search
CPC ........ B25J 13/086; B25J 5/007; B25J 9/1612; B25J 15/08; B25J 19/023
See application file for complete search history.

(56) References Cited

U.S. PATENT DOCUMENTS 4,718,023 A * 1/1988 Arora .................... B25J 9/1692 73/625
10,471,591 B1 * 11/2019 Hinkle .................. B25J 9/1612
(Continued)

FOREIGN PATENT DOCUMENTS

JP 11-312213 A 11/1999
JP 2021-047126 A 3/2021
(Continued)

OTHER PUBLICATIONS

International Search Report and Written Opinion of PCT Application No. PCT/JP2022/042663, issued on Jan. 10, 2023, 09 pages of ISRWO.

*Primary Examiner* — Adam R Mott
*Assistant Examiner* — Matthew C Gammon
(74) *Attorney, Agent, or Firm* — CHIP LAW GROUP

(57) ABSTRACT

Provided is a mobile body that includes a first sensor capable of measuring three-dimensional information and a second sensor capable of measuring a distance, the second sensor having a minimum measurement distance smaller than a minimum measurement distance of the first sensor, and having a visual field overlapping with a visual field of the first sensor. The mobile body also includes a control unit that executes positioning control for an object by switching a sensor to be used among the first sensor and the second sensor on the basis of a distance to the object.

15 Claims, 11 Drawing Sheets

(51) Int. Cl.

| | |
|---|---|
| ***B25J 9/16*** | (2006.01) |
| ***B25J 15/08*** | (2006.01) |
| ***B25J 19/02*** | (2006.01) |

(56) References Cited

U.S. PATENT DOCUMENTS

| | | | | |
|---|---|---|---|---|
| 2009/0285664 | A1* | 11/2009 | Kim | B25J 9/1612 414/730 |
| 2010/0256814 | A1* | 10/2010 | Smith | B25J 13/082 700/258 |
| 2019/0091875 | A1* | 3/2019 | Amacker | B25J 13/086 |
| 2019/0176348 | A1* | 6/2019 | Bingham | B25J 15/0004 |
| 2020/0189631 | A1* | 6/2020 | Gorman | B61L 15/0072 |
| 2021/0215811 | A1* | 7/2021 | Couture | G05D 1/628 |
| 2023/0146712 | A1* | 5/2023 | DeStories | B25J 9/1684 700/245 |
| 2023/0191617 | A1* | 6/2023 | Kim | B25J 9/1612 700/245 |
| 2024/0027617 | A1* | 1/2024 | Kawamae | H04M 1/724097 |

FOREIGN PATENT DOCUMENTS

| | | | |
|---|---|---|---|
| JP | 2021-113768 | A | 8/2021 |
| WO | 2021/029205 | A1 | 2/2021 |

* cited by examiner 15
34
41
61
62-4
62-5
42R
42L
V61A
V61B
201
ALIGNMENT USING DISTANCE DISTRIBUTION
BY DEPTH CAMERA 15
34
41
61
62-4
62-5
42R
42L
V62-4
V62-5
201
ALIGNMENT USING DISTANCE DISTRIBUTION
BY DISTANCE SENSOR ARRAY 15
34
41
61
62-4
62-5
42R
42L
V62-4
V62-5
201
ALIGNMENT COMPLETED

MOBILE BODY AND POSITIONING CONTROL METHOD

CROSS REFERENCE TO RELATED APPLICATIONS

This application is a U.S. National Phase of International Patent Application No. PCT/JP2022/042663 filed on Nov. 17, 2022, which claims priority benefit of Japanese Patent Application No. JP 2021-195416 filed in the Japan Patent Office on Dec. 1, 2021. Each of the above-referenced applications is hereby incorporated herein by reference in its entirety.

TECHNICAL FIELD

The present technology relates to a mobile body and a positioning control method, and more particularly to a mobile body and a positioning control method capable of improving accuracy of positioning control.

BACKGROUND ART

Conventionally, a technique has been proposed in which visual servo is performed on the basis of three-dimensional information obtained by a depth camera to align a robot hand with an object (see, for example, Patent Document 1).

CITATION LIST

Patent Document

Patent Document 1: Japanese Patent Application Laid-Open No. 2021-113768

SUMMARY OF THE INVENTION

Problems to be Solved by the Invention

In general, since it is difficult to achieve both measurement at a short distance (within about 200 mm) and measurement at a long distance (after about 200 mm), the depth camera is adjusted so as to be able to measure a long distance. Furthermore, the depth camera has a narrower visual field as the distance to the object becomes shorter. Furthermore, in a case where the depth camera is mounted at a position away from the palm of the robot hand (for example, in the middle of the arm), as the robot hand approaches the object, the object does not fit in the visual field of the depth camera. Therefore, in a case where positioning control of the robot hand is performed using the depth camera, accuracy of positioning control particularly for an object at a short distance is deteriorated.

The present technology has been made in view of such a situation, and is intended to improve the accuracy of positioning control.

Solutions to Problems

A mobile body according to one aspect of the present technology includes: a first sensor capable of measuring three-dimensional information; a second sensor capable of measuring a distance, the second sensor having a minimum measurement distance smaller than a minimum measurement distance of the first sensor, and having a visual field overlapping with a visual field of the first sensor; and a control unit that executes positioning control for an object by switching a sensor to be used among the first sensor and the second sensor on the basis of a distance to the object.

A positioning control method according to one aspect of the present technology includes by a mobile body including a first sensor capable of measuring three-dimensional information, and a second sensor capable of measuring a distance, the second sensor having a minimum measurement distance smaller than a minimum measurement distance of the first sensor, and having a visual field overlapping with a visual field of the first sensor, executing positioning control for an object by switching a sensor to be used among the first sensor and the second sensor on the basis of a distance to the object.

In one aspect of the present technology, by a mobile body including: a first sensor capable of measuring three-dimensional information; and a second sensor capable of measuring a distance, the second sensor having a minimum measurement distance smaller than a minimum measurement distance of the first sensor, and having a visual field overlapping with a visual field of the first sensor, positioning control for an object is executed by switching a sensor to be used among the first sensor and the second sensor on the basis of a distance to the object.

MODE FOR CARRYING OUT THE INVENTION

Hereinafter, modes for carrying out the present technology will be described. The description will be given in the following order.

1. Embodiment of present technology
2. Modifications
3. Others

1. Embodiment of Present Technology

An embodiment of the present technology will be described with reference to FIGS. 1, 2, 3, 4, 5A, 5B, 5C, 6A, 6B, 7A, 7B, 8, 9A, [to] and 9B.

Configuration Example of Robot 1

Figure 1:
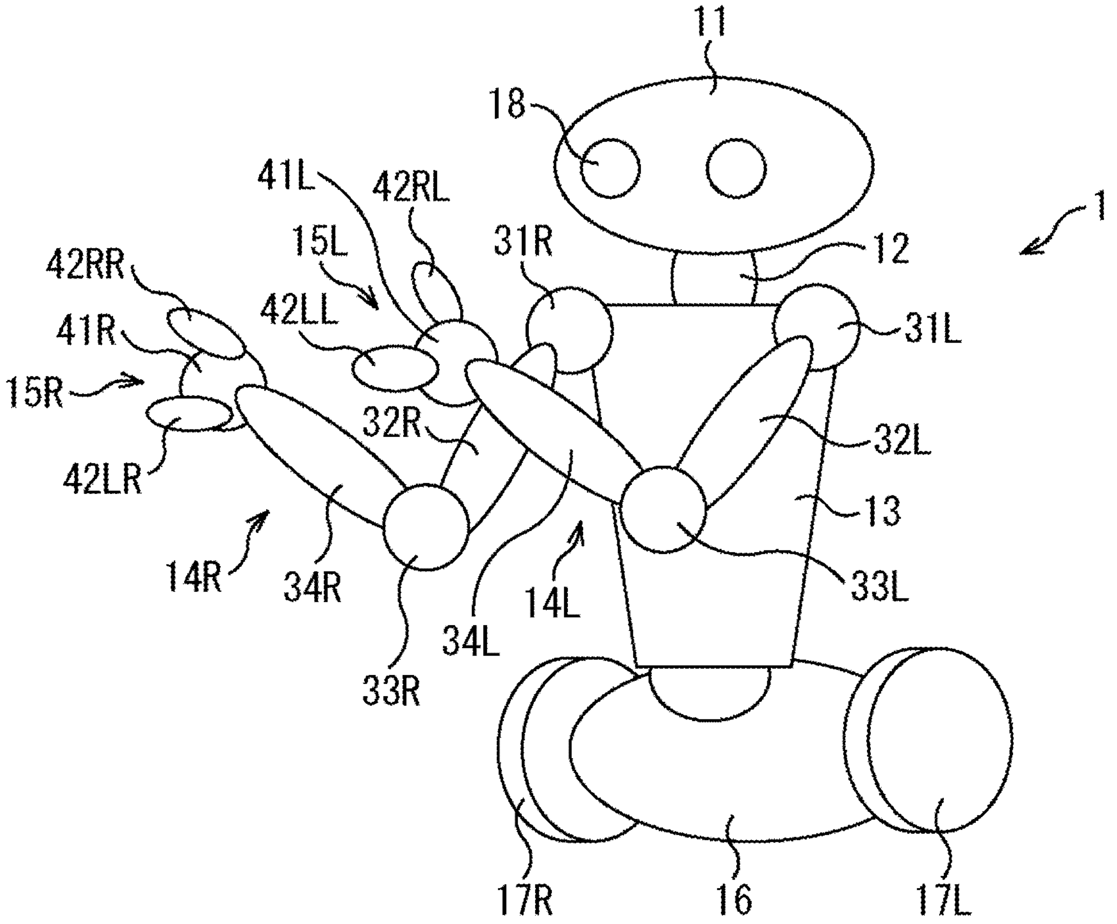
FIG. 1 is a schematic diagram illustrating a configuration example of a robot to which the present technology is applied.

FIG. 1 is a schematic diagram illustrating an embodiment of a robot 1 to which the present technology is applied.

Note that, hereinafter, the left-right direction of the robot 1 is defined by the direction viewed from the robot 1. For example, the left side (right side as viewed from the robot 1) in FIG. 1 is defined as a right direction, and the right side (left side as viewed from the robot 1) is defined as a left direction.

The robot 1 includes a head portion 11, a neck portion 12, a body portion 13, an arm 14L, an arm 14R, a hand 15L, a hand 15R, a waist portion 16, a wheel 17L, and a wheel 17R.

The head portion 11 is connected to the upper surface of the body portion 13 via the neck portion 12. The head portion 11 is rotatable in a roll direction, a yaw direction, and a pitch direction with respect to the body portion 13 via the neck portion 12, for example.

The body portion 13 is connected above the waist portion 16. The body portion 13 is rotatable in the yaw direction with respect to the waist portion 16, for example.

The arm 14L is a portion corresponding to the left arm of a human, and is connected to the upper left end of the body portion 13. The arm 14L includes a joint 31L, a link 32L, a joint 33L, and a link 34L.

The joint 31L is a portion corresponding to the left shoulder joint of a human, and is provided at the upper left end of the body portion 13.

The link 32L is a portion corresponding to the upper left arm portion of a human, and is connected to the upper left end of the body portion 13 via the joint 31L. For example, the link 32L can rotate in three degrees of freedom via the joint 31L. Specifically, for example, the link 32L can rotate or twist in the front-rear direction and the left-right direction.

The joint 33L is a portion corresponding to the left elbow joint of a human, and is connected to the distal end of the link 32L.

The link 34L is a portion corresponding to the left forearm portion of a human, and is connected to the link 32L via the joint 33L. For example, the link 34L can rotate with respect to the link 32L in two degrees of freedom via the joint 33L. Specifically, for example, the link 34L can rotate or twist in a direction in which the arm 14L (elbow) expands and contracts.

The arm 14R is a portion corresponding to the right arm of a human, and is connected to the upper right end of the body portion 13. The arm 14R includes a joint 31R, a link 32R, a joint 33R, and a link 34 R. The arm 14R has a similar configuration to the arm 14L, and can move symmetrically with the arm 14L.

The hand 15L is a portion corresponding to the left hand of a human, and is connected to the distal end of the arm 14L. The hand 15L includes a base portion 41L, a finger 42LL, and a finger 42RL.

The base portion 41L is a portion corresponding to the palm and the back of the hand of a human, and is connected to the distal end of the link 34L. For example, the base portion 41L can rotate with respect to the link 34L in one degree of freedom. Specifically, for example, the base portion 41L can rotate about an axis extending in the extending direction of the link 34L.

The finger 42LL and the finger 42RL are connected to the distal end of the base portion 41L at a predetermined interval. The finger 42LL and the finger 42RL can be moved in directions of approaching and separating from each other, and can sandwich an object.

The hand 15R is a portion corresponding to the right hand of a human, and is connected to the distal end of the arm 14R. The hand 15R includes a base portion 41R, a finger 42LR, and a finger 42RR. The hand 15R has a similar configuration to the hand 15L and can move similarly to the hand 15R.

Note that a detailed configuration example of the hand 15L and the hand 15R will be described later.

A wheel 17L is connected to a left end of the waist portion 16. A wheel 17R is connected to a right end of the waist portion 16. The robot 1 can move forward, backward, and rotate by the wheel 17L and the wheel 17R, for example.

An RGB-D camera 18 is provided near the left eye or the right eye (right eye in this drawing) of the head portion 11. The RGB-D camera 18 images a subject and measures a distance to the subject, and generates a color image indicating a color of each pixel and a distance image indicating a distance (depth) of each pixel. The RGB-D camera 18 outputs data indicating a color image (hereinafter, referred to as color image data) and data indicating a distance image (hereinafter, it is referred to as distance image data).

Hereinafter, in a case where it is not necessary to individually distinguish the arm 14L and the arm 14R, they are simply referred to as the arm 14. Hereinafter, in a case where it is not necessary to individually distinguish the hand 15L and the hand 15R, they are simply referred to as the hand 15. Hereinafter, in a case where it is not necessary to individually distinguish the joint 31L and the joint 31R, they are simply referred to as the joint 31. Hereinafter, in a case where it is not necessary to individually distinguish the link 32L and the link 32R, they are simply referred to as the link 32. Hereinafter, in a case where it is not necessary to individually distinguish the joint 33L and the joint 33R, they are simply referred to as the joint 33. Hereinafter, in a case where it is not necessary to individually distinguish the link 34L and the link 34 R, they are simply referred to as the link 34.

Hereinafter, in a case where it is not necessary to individually distinguish the base portion 41L and the base portion 41R, they are simply referred to as the base portion 41. Hereinafter, in a case where it is not necessary to individually distinguish the finger 42LL and the finger 42LR, they are simply referred to as the finger 42L. Hereinafter, in a case where it is not necessary to individually distinguish the finger 42RL and the finger 42RR, they are simply referred to as the finger 42R. Hereinafter, in a case where it is not necessary to individually distinguish the finger 42L and the finger 42R, they are simply referred to as the finger 42.

Configuration Example of Hand 15

Figure 2:
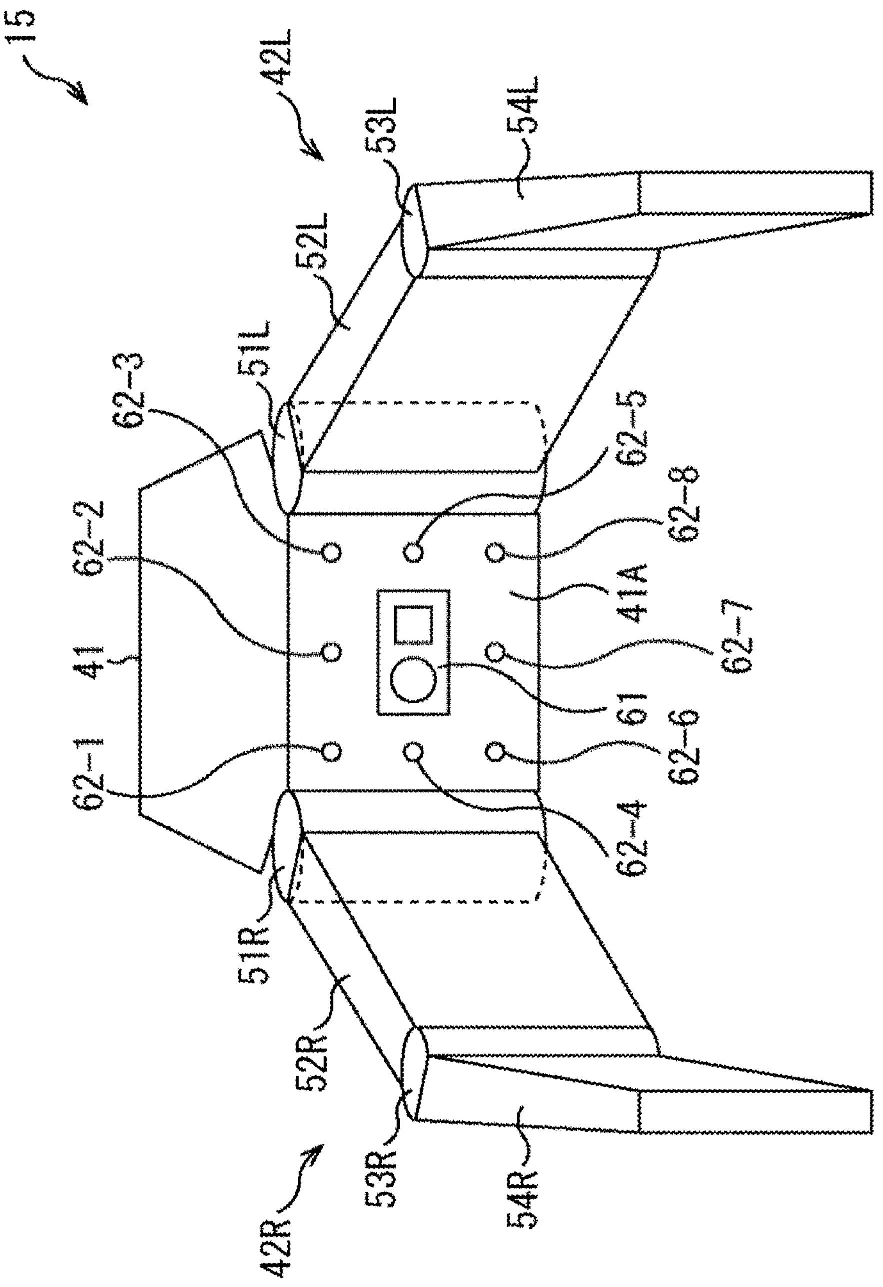
FIG. 2 is an external diagram illustrating a configuration example of a hand of the robot in FIG. 1.

FIG. 2 illustrates a configuration example of the hand 15 of the robot 1.

As described above, the hand 15 includes the base portion 41, the finger 42L, and the finger 42R.

The finger 42L is connected to a left end of a palm 41A, which is a rectangular surface at a distal end of the base portion 41 (a rectangular surface on a side opposite to a surface connected to the link 34). The finger 42L includes a joint 51L, a link 52L, a joint 53L, and a link 54L.

The joint 51L is provided at the left end of the palm 41A so as to extend along the left end of the palm 41A.

The link 52L corresponds to a base end of a human finger, and is connected to the left end of the palm 41A of the base portion 41 via the joint 51L. The link 52L has a rectangular plate shape and can rotate with the joint 51L as an axis. That is, the link 52L can rotate in a direction approaching the palm 41A and a direction away from the palm 41A with the joint 51L as an axis.

The joint 53L is connected to the distal end of the link 52L.

The link 54L corresponds to a distal end of a human finger, and is connected to the distal end of the link 52L via the joint 53L. The link 54L has a tapered plate shape with a slightly tapered distal end, and can rotate with the joint 53L as an axis. That is, the link 54L can rotate in a direction in which the finger 42L is bent or stretched with the joint 53L as an axis.

The finger 42R is connected to a right end of the palm 41A. The finger 42R includes a joint 51R, a link 52R, a joint 53R, and a link 54R. The finger 42R has a similar configuration to the finger 42L, and can move symmetrically with the finger 42L.

The finger 42L and the finger 42R can move in a direction of approaching or separating from each other. Then, the finger 42L and the finger 42R move in directions facing each other (approaching directions), so that an object can be sandwiched.

The palm 41A is provided with a depth camera 61 and a distance sensor 62-1 to a distance sensor 62-8. The depth camera 61 is arranged at the center of the palm 41A. The distance sensors 62-1 to 62-8 are arranged in an array so as to surround the periphery of the palm 41A. The distance sensors 62-1 to 62-3 are arranged in a line along the upper side of the palm 41A above the depth camera 61. The distance sensors 62-6 to 62-8 are arranged in a line along the lower side of the palm 41A below the depth camera 61. The distance sensor 62-1, the distance sensor 62-4, and the distance sensor 62-6 are arranged in a line along the right side of the palm 41A on the right side of the depth camera 61. The distance sensor 62-3, the distance sensor 62-5, and the distance sensor 62-8 are arranged in a line along the left side of the palm 41A on the left side of the depth camera 61.

Hereinafter, in a case where it is not necessary to individually distinguish the distance sensor 62-1 to the distance sensor 62-8, they are simply referred to as the distance sensor 62. In addition, hereinafter, a sensor group in which the distance sensors 62-1 to 62-8 are arranged in an array is referred to as a distance sensor array SA.

The depth camera 61 is a camera capable of acquiring three-dimensional information. That is, the depth camera 61 is a camera capable of detecting a distance in a direction centered on a direction perpendicular to the palm 41A for a large number of measurement points (for example, 320 points in width×240 points in height=76,800 points). For example, a camera using an optical time of flight (ToF) principle is used for the depth camera 61. The depth camera 61 generates a distance image indicating a distance (depth) of each pixel. The depth camera 61 outputs distance image data indicating a distance image.

Each distance sensor 62 is, for example, a sensor capable of measuring a distance in a similar direction to the depth camera 61, that is, a direction centered on a direction perpendicular to the palm 41A, for each one measurement point. For example, a distance sensor using an optical time of flight (ToF) principle is used for the distance sensor 62. Each distance sensor 62 outputs distance data indicating the measured distance. The visual field of each distance sensor 62 partially overlaps with the visual field of the depth camera 61.

In addition, the range of the distance that can be measured by the depth camera 61 (hereinafter, referred to as a measurement range) partially overlaps with the measurement range of the distance sensor 62. Specifically, the maximum value (hereinafter, referred to as a maximum measurement distance) of the measurement range of the depth camera 61 is larger than the maximum measurement distance of the distance sensor 62. On the other hand, the minimum value (hereinafter, referred to as a minimum measurement distance) of the measurement range of the distance sensor 62 is smaller than the minimum measurement distance of the depth camera 61. That is, the depth camera 61 can measure a longer distance than the distance sensor 62, and the distance sensor 62 can measure a shorter distance than the depth camera 61.

Configuration Example of Control Unit 101

Figure 3:
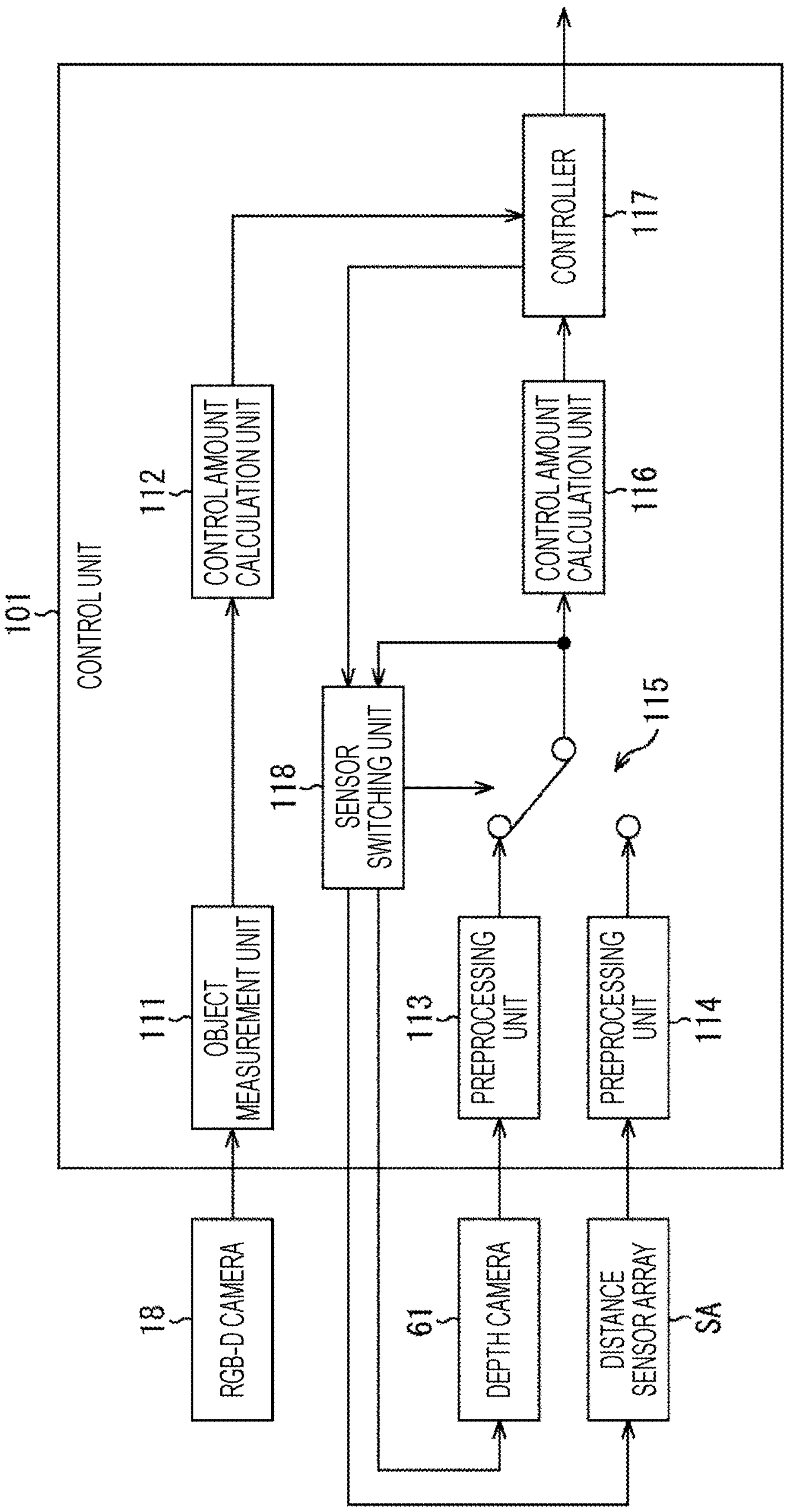
FIG. 3 is a block diagram illustrating a configuration example of a control unit of the robot in FIG. 1.

FIG. 3 illustrates a configuration example of the control unit 101 that executes positioning control (servo) of the hand 15 of the robot 1 and control of gripping of an object by the hand 15. The positioning of the hand 15 is, for example, processing of adjusting relative positions and relative postures of the hand 15 and the finger 42 with respect to an object to be gripped (hereinafter, referred to as a target object) in order to grip the target object (processing of aligning with respect to the target object).

Note that FIG. 3 illustrates a configuration example of a portion that performs control on the arm 14L and the hand 15L or one of the arm 14R and the hand 15R for easy understanding of the drawing.

The control unit 101 includes an object measurement unit 111, a control amount calculation unit 112, a preprocessing unit 113, a preprocessing unit 114, a switch 115, a control amount calculation unit 116, a controller 117, and a sensor switching unit 118.

The object measurement unit 111 measures the shape and position of an object to be gripped (hereinafter, referred to as a target object) on the basis of the color image data and the distance image data supplied from the RGB-D camera 18. The object measurement unit 111 supplies information indicating the shape and position of the target object to the control amount calculation unit 112.

The control amount calculation unit 112 calculates a position at which the target object is gripped (hereinafter, referred to as a target gripping position) on the basis of the shape and position of the target object. The control amount calculation unit 112 plans a trajectory of the arm 14 for moving the hand 15 to before the target gripping position. The control amount calculation unit 112 calculates control amounts of the drive units of the arm 14 and the hand 15 (for example, the joint 31, the joint 33, the base portion 41, the joint 51, the joint 53, and the like) necessary for moving the hand 15 according to the planned trajectory. The control amount calculation unit 112 supplies information indicating the calculated control amount to the controller 117.

The preprocessing unit 113 executes preprocessing such as filter processing on the depth image data supplied from the depth camera 61. The preprocessing unit 113 supplies the distance image data after the preprocessing to the control amount calculation unit 116 and the sensor switching unit 118 via the switch 115.

The preprocessing unit 114 performs preprocessing such as filtering on a distance data group supplied from each distance sensor 62 constituting the distance sensor array SA. The preprocessing unit 114 supplies the distance data group after the preprocessing to the control amount calculation unit 116 and the sensor switching unit 118 via the switch 115.

The switch 115 connects the control amount calculation unit 116 to the preprocessing unit 113 or the preprocessing unit 114 by switching the state of the contact under the control of the sensor switching unit 118.

The control amount calculation unit 116 acquires, via the switch 115, the distance image data after preprocessing supplied from the preprocessing unit 113 or the distance data group after preprocessing supplied from the preprocessing unit 114. The control amount calculation unit 116 calculates the movements of the arm 14 and the hand 15 necessary for gripping the target object on the basis of the distance image data and the distance data group. The control amount calculation unit 116 calculates the control amounts of the drive units of the arm 14 and the hand 15 necessary for realizing the calculated movements of the arm 14 and the hand 15. The control amount calculation unit 116 supplies information indicating the calculated control amount to the controller 117.

The controller 117 controls the drive units of the arm 14 and the hand 15 on the basis of the control amount supplied from the control amount calculation unit 112 or the control amount calculation unit 116 to adjust the relative positions and the relative postures of the arm 14 and the hand 15 with respect to the target object, and causes the hand 15 to grip the target object. In addition, the controller 117 notifies the sensor switching unit 118 that the hand 15 has approached the vicinity of the target object.

The sensor switching unit 118 acquires, via the switch 115, the distance image data after preprocessing supplied from the preprocessing unit 113 or the distance data group after preprocessing supplied from the preprocessing unit 114. The sensor switching unit 118 controls the state of the contact of the switch 115 on the basis of the distance to the target object indicated by the distance image data or the distance data group or the information from the controller 117. In addition, the sensor switching unit 118 controls the states of the depth camera 61 and each distance sensor 62 included in the distance sensor array SA on the basis of the distance to the target object indicated in the distance image data or the distance data group or the information from the controller 117.

Note that, as described above, FIG. 3 illustrates a configuration example of a portion that performs control on the arm 14L and the hand 15L or one of the arm 14R and the hand 15R for easy understanding of the drawing. In practice, for example, a portion that performs control on the arm 14L and the hand 15L or one of the arm 14R and the hand 15R is added to the configuration of FIG. 3. Specifically, for example, another set of the preprocessing unit 113, the preprocessing unit 114, and the switch 115 is added.

<Object Gripping Control Processing>

Figure 4:
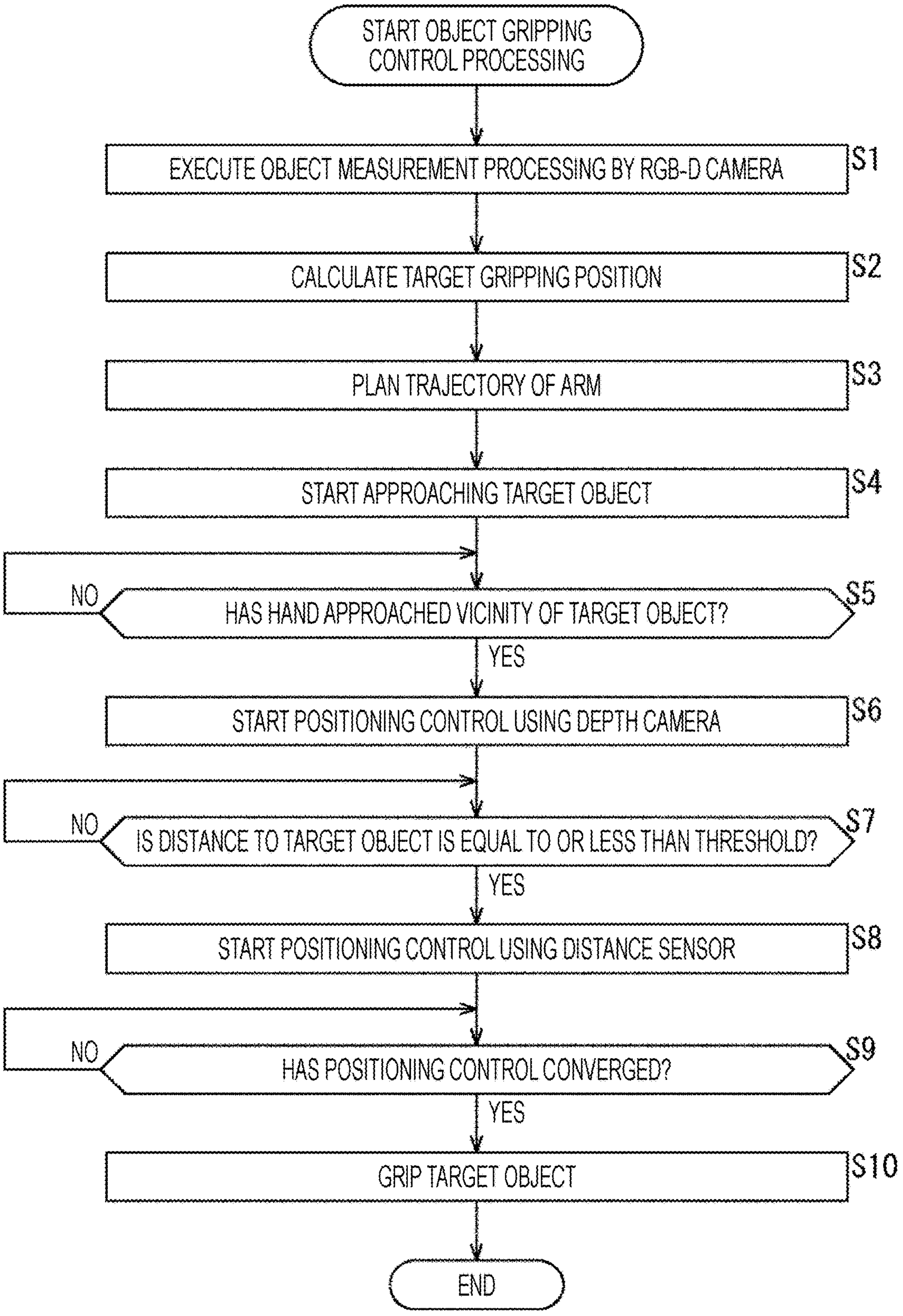
FIG. 4 is a flowchart for explaining object gripping control processing executed by the robot in FIG. 1.

Next, object gripping control processing executed by the robot 1 will be described with reference to a flowchart of FIG. 4.

In step S1, the robot 1 executes object measurement processing by the RGB-D camera 18. Specifically, the RGB-D camera 18 images a target object, and supplies the obtained color image data and distance image data to the object measurement unit 111. The object measurement unit 111 measures the shape and position of the target object on the basis of the color image data and the distance image data. The object measurement unit 111 supplies information indicating the measured shape and position of the target object to the control amount calculation unit 112.

In step S2, the control amount calculation unit 112 calculates the target gripping position on the basis of the shape and position of the target object.

In step S3, the control amount calculation unit 112 plans the trajectory of the arm 14. Specifically, the control amount calculation unit 112 plans the trajectory of the arm 14 for moving the hand 15 to a position that is before the target gripping position and at which the distance from the palm 41A of the base portion 41 of the hand 15 to the target object is equal to or less than a predetermined threshold D1. The threshold D1 is set to satisfy, for example, the condition of the maximum measurable distance of the distance sensor 62<D1≤the maximum measurable distance of the depth camera 61.

The control amount calculation unit 112 calculates the control amounts of the drive units of the arm 14 and the hand 15 necessary for moving the hand 15 according to the planned trajectory. The control amount calculation unit 112 supplies the calculated control amount to the controller 117.

In step S4, the robot 1 starts approaching the target object. Specifically, the controller 117 controls the drive units of the arm 14 and the hand 15 on the basis of the control amount to move the hand 15 according to the trajectory planned by the control amount calculation unit 112.

In step S5, the controller 117 determines whether or not the hand 15 has approached the vicinity of the target object. The determination processing in step S5 is repeatedly executed until it is determined that the hand 15 has approached the vicinity of the target object. Then, when the movement of the arm 14 based on the trajectory planned by the control amount calculation unit 112 is completed, the controller 117 determines that the hand 15 has approached the vicinity of the target object, and the processing proceeds to step S6.

In step S6, the robot 1 starts positioning control using the depth camera 61.

Specifically, the controller 117 notifies the sensor switching unit 118 that the hand 15 has approached the vicinity of the target object.

The sensor switching unit 118 sets the contact of the switch 115 in a state where the preprocessing unit 113 and the control amount calculation unit 116 are connected. Furthermore, the sensor switching unit 118 activates the depth camera 61.

The depth camera 61 starts processing of measuring the distance to the target object at each measurement point, generating distance image data indicating the measurement result, and supplying the distance image data to the preprocessing unit 113.

The preprocessing unit 113 executes preprocessing on the distance image data, and starts processing of supplying the distance image data after the preprocessing to the control amount calculation unit 116 and the sensor switching unit 118 via the switch 115.

The control amount calculation unit 116 and the controller 117 start positioning control similar to general visual servo, for example. For example, as illustrated in FIG. 5A, the control amount calculation unit 116 and the controller 117 start alignment of the hand 15 using the distance distribution to the target object indicated by the distance image data.

Figures 5A, 5B, 5C:
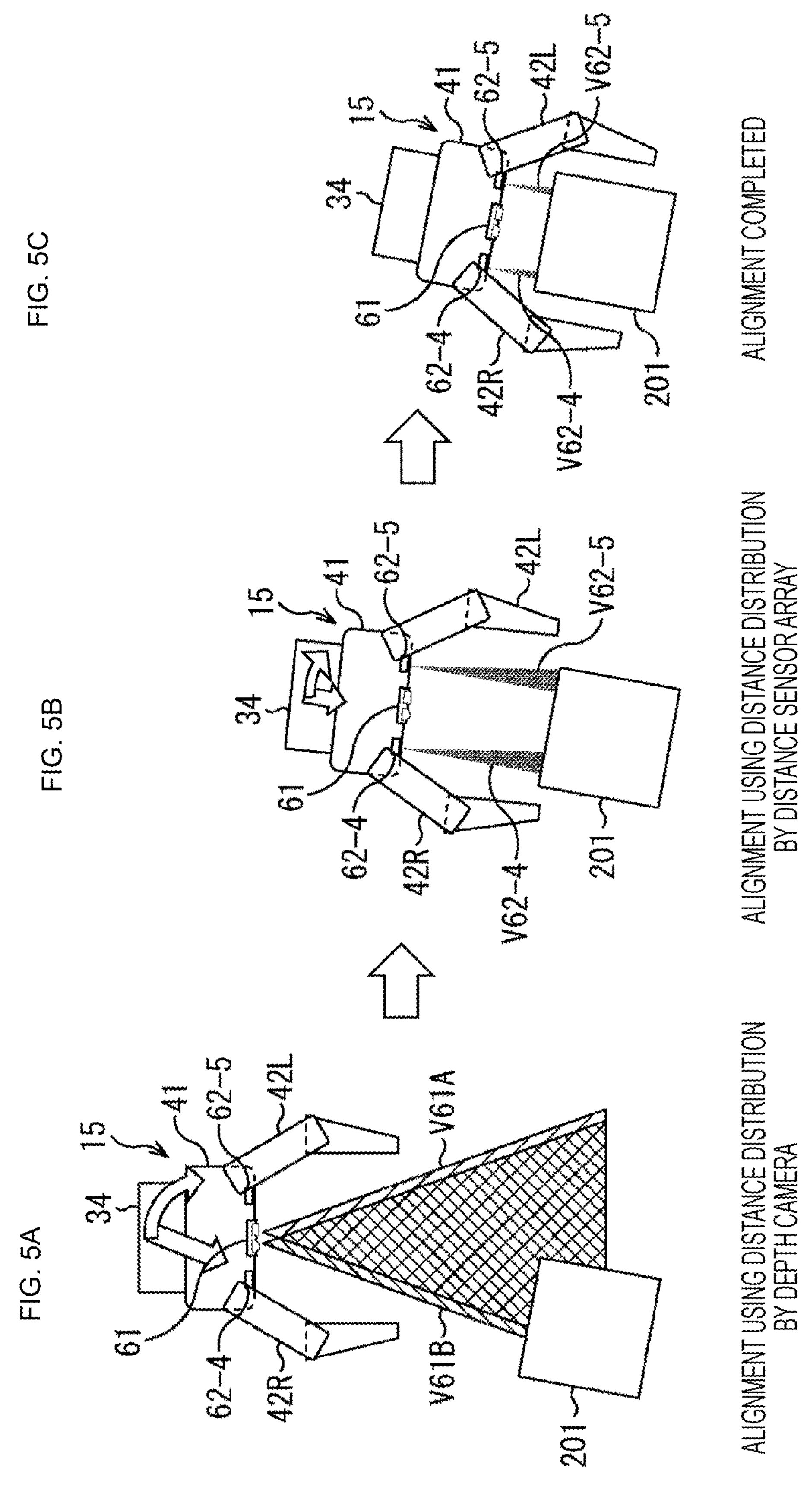
FIGS. 5A, 5B and 5C are diagrams for describing a specific example of the object gripping control processing.

Note that an irradiation region V61A in FIG. 5A indicates an irradiation region of the light emitting element (laser beam) of the depth camera 61. A visual field V61B indicates a visual field of the light receiving element of the depth camera 61. A region where the irradiation region V61A and the visual field V61B overlap with each other is the visual field of the depth camera 61, which is an area where the depth camera 61 can measure the distance. Furthermore, a visual field V62-4 in FIGS. 5B and 5C indicates a visual field of the distance sensor 62-4 which is a region where the distance sensor 62-4 can measure the distance. A visual field V62-5 indicates a visual field of the distance sensor 62-5 which is a region where the distance sensor 62-5 can measure the distance. Note that the visual field V62-4 is strictly divided into the irradiation region of the light emitting element and the visual field of the light receiving element of the distance sensor 62-4, but since both are in substantially the same range, they are illustrated as one visual field. This similarly applies to the visual field V62-5.

For example, the control amount calculation unit 116 and the controller 117 adjust the posture of the hand 15 with respect to the target object.

Specifically, for example, the control amount calculation unit 116 detects the center of gravity of the distance image. The control amount calculation unit 116 calculates the posture of the hand 15 in which the center of gravity of the range image coincides with the center of the range image.

Alternatively, for example, the control amount calculation unit 116 detects the inclination of the target object in a case where the distance distribution to the target object indicated by the distance image data is approximated to a plane. The control amount calculation unit 116 calculates the posture of the hand 15 in which the palm 41A of the hand 15 is parallel to the detected inclination of the target object.

The control amount calculation unit 116 calculates control amounts of the drive units of the arm 14 and the hand 15 necessary for setting the hand 15 to the calculated posture. The control amount calculation unit 116 supplies information indicating the calculated control amount to the controller 117.

The controller 117 controls the drive units of the arm 14 and the hand 15 on the basis of the calculated control amounts to adjust the posture of the hand 15.

In addition, for example, the control amount calculation unit 116 calculates the control amounts of the drive units of the arm 14 and the hand 15 necessary for causing the palm 41A of the hand 15 to approach the target object. The control amount calculation unit 116 supplies information indicating the calculated control amount to the controller 117.

The controller 117 controls the drive units of the arm 14 and the hand 15 on the basis of the calculated control amounts to bring the hand 15 close to the target object.

In step S7, the sensor switching unit 118 determines whether or not the distance to the target object is equal to or less than a threshold on the basis of the distance image data.

Figure 6B:
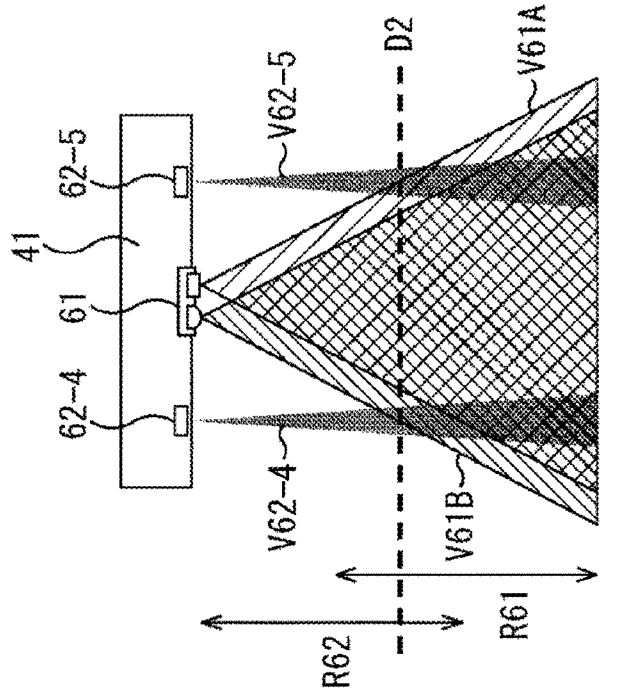
FIGS. 6A and 6B are diagrams for explaining a method of setting a distance for switching between a depth camera and a distance sensor.
Figure 6A:
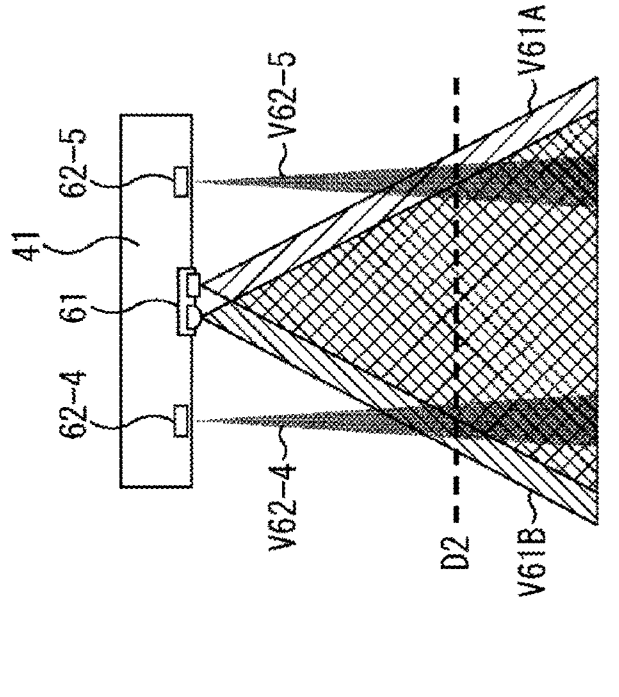

FIGS. 6A and 6B illustrate setting examples of a threshold D2 used for the processing in step S7.

In FIGS. 6A and 6B the width in the horizontal direction of the region where the irradiation region V61A and the visual field V61B overlap with each other indicates the measurement area of the depth camera 61. The width in the horizontal direction between the visual field V62-4 and the visual field V62-5 indicates a range (that is, the measurement area of the distance sensor array SA) of a region where the distance can be measured by each distance sensor 62 included in the distance sensor array SA.

In the example of FIG. 6A, the threshold D2 is set to be equal to or less than a distance at which the measurement area of the depth camera 61 and the measurement area of the distance sensor array SA substantially coincide with each other. In other words, the threshold D2 is set to a distance at which the size of the measurement area of the distance sensor array SA is equal to or larger than the size of the measurement area of the depth camera 61. Therefore, when the distance to the target object is less than the threshold D2, the measurement area of the distance sensor array SA becomes wider than the measurement area of the distance sensor array SA.

In the example of FIG. 6B, the threshold D2 is set to a distance within a range in which a measurement range R61 of the depth camera 61 and a measurement range R62 of the distance sensor 62 overlap with each. For example, the threshold D2 is set to an average value of distances within a range in which the measurement range R61 and the measurement range R62 overlap with each.

The determination processing in step S7 is repeatedly executed until it is determined that the distance to the target object is equal to or less than the threshold. Then, in a case where it is determined that the distance to the target object is equal to or less than the threshold, the processing proceeds to step S8.

In step S8, the robot 1 starts positioning control using the distance sensor 62.

Specifically, the sensor switching unit 118 sets the contact of the switch 115 in a state where the preprocessing unit 114 and the control amount calculation unit 116 are connected. Furthermore, the sensor switching unit 118 stops the depth camera 61 and activates each distance sensor 62.

Each distance sensor 62 starts processing of measuring the distance to the target object and supplying distance data indicating the measurement result to the preprocessing unit 114. The preprocessing unit 114 executes preprocessing on the distance data group from each distance sensor 62, and starts processing of supplying the distance data group after the preprocessing to the control amount calculation unit 116 and the sensor switching unit 118 via the switch 115.

As illustrated in FIG. 5B, the control amount calculation unit 116 and the controller 117 start alignment of the hand 15 using the distance distribution to the target object indicated by the distance data group measured by the distance sensor array SA.

For example, the control amount calculation unit 116 adjusts the posture of the hand 15 on the basis of the distance distribution to the target object indicated by the distance data group, and calculates the control amounts of the drive units of the arm 14 and the hand 15 necessary for causing the hand 15 to approach the target object. The control amount calculation unit 116 supplies information indicating the calculated control amount to the controller 117.

The controller 117 controls the drive units of the arm 14 and the hand 15 on the basis of the calculated control amounts to adjust the posture of the hand 15 and bring the hand 15 close to the target object.

Here, also in the case of using the distance sensor 62, similarly to the case of using the depth camera 61, the posture and the position of the hand 15 are controlled on the basis of the distance distribution to the target object measured by each distance sensor 62. Therefore, also in the case of using the distance sensor 62, the posture and the position of the hand 15 can be controlled by a similar control method to the case of using the depth camera 61.

Note that, for example, in a case where the distance to the target object measured by the distance sensor 62 is equal to or more than a threshold D3, the sensor used for positioning control is switched from the distance sensor 62 to the depth camera 61. Furthermore, each distance sensor 62 is stopped, and the depth camera 61 is activated.

The threshold D3 is set to satisfy, for example, the condition of D2≤D3≤the maximum measurable distance of the distance sensor 62.

In step S9, the control amount calculation unit 116 determines whether or not the positioning control has converged. The determination processing in step S9 is repeatedly executed until it is determined that the positioning control has converged.

Then, for example, in a case where the distance to the target object is equal to or less than a predetermined threshold and the distance between the barycentric position of the distance to the target object and the center position of the palm 41A of the base portion 41 is equal to or less than a predetermined threshold, the control amount calculation unit 116 determines that the positioning control has converged, and the processing proceeds to step S10.

As a result, as illustrated in FIG. 5C, the alignment of the hand 35 with respect to the target object 201 is completed. Specifically, for example, the target object 201 is arranged substantially at the center between the finger 42L and the finger 42R of the hand 15, and approaches the palm 41A by a predetermined distance. Furthermore, for example, the side surface of the target object 201 is substantially parallel to the finger 42L and the finger 42R.

In step S10, the robot 1 grips the target object. Specifically, the control amount calculation unit 116 calculates the control amounts of the drive units of the hand 15 for the hand 15 to grip the target object. The control amount calculation unit 116 supplies information indicating the calculated control amount to the controller 117.

The controller 117 controls the drive units of the hand 15 on the basis of the calculated control amount to grip the target object with each finger 42.

Thereafter, the object gripping control processing ends.

As described above, the sensor used for positioning control is switched on the basis of the distance to the target object. That is, when the hand 35 approaches the target object, the sensor used for positioning control is switched from the depth camera 61 to the distance sensor array SA.

The depth camera 61 has a larger number of measurement points than the distance sensor array SA, and can measure not only the distance distribution of the target object but also three-dimensional information (three-dimensional shape) of the target object.

On the other hand, since the depth camera 61 has a large number of measurement points, the measurement load of the distance distribution increases, and the sampling rate also decreases (for example, about 30 Hz). Furthermore, as described above, it is difficult for the depth camera 61 to measure a short distance, or the measurement accuracy decreases.

On the other hand, the distance sensor array SA has a smaller number of measurement points than the depth camera 61, and is several points to several tens of points (8 points in the case of the example of FIG. 2) at most. Therefore, the measurement load of the distance distribution is reduced, and the sampling rate can be increased. In addition, in general, the measurement accuracy of the distance sensor 62 is improved as the distance sensor 62 approaches the target object.

In addition, the measurement area of the depth camera 61 becomes narrower as the depth camera 61 approaches the target object.

Figure 7B:
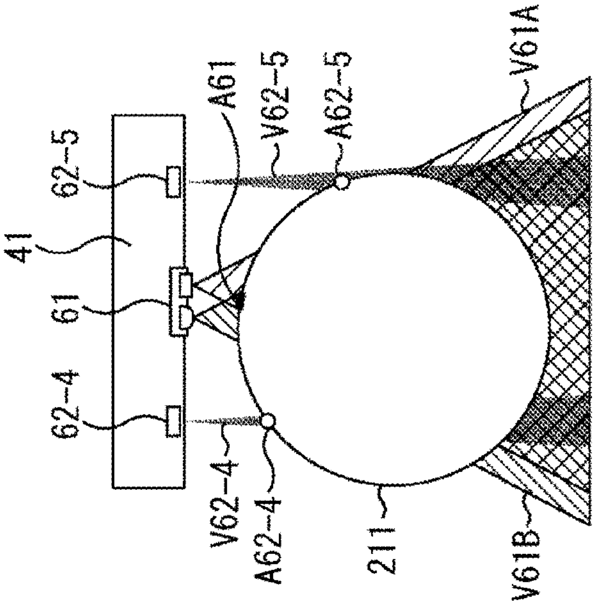
FIGS. 7A and 7B are diagrams for comparing measurement areas of the depth camera and the distance sensor.
Figure 7A:
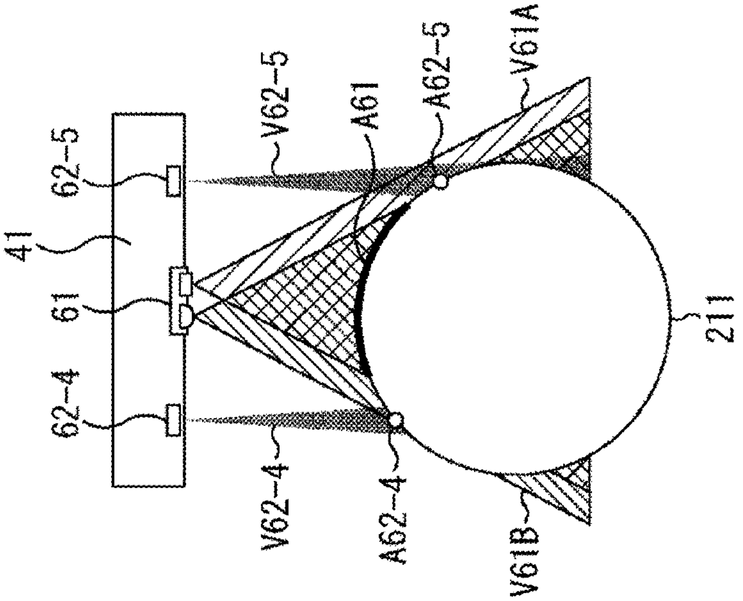

For example, FIGS. 7A and 7B are diagrams comparing the measurement area of the depth camera 61 with respect to a spherical target object 211 with the measurement area of the distance sensor array SA.

In FIGS. 7A and 7B, a measurement area A61 of the depth camera 61 is a range in which the irradiation region V61A of the light emitting element and the visual field V61B of the light receiving element of the depth camera 61 overlap with each other on the surface of the target object 211.

A measurement area A62-4 of the distance sensor 62-4 is a range in which the visual field V62-4 of the distance sensor 62-4 and the surface of the target object 211 overlap with each other. A measurement area A62-5 of the distance sensor 62-5 is a range in which the visual field V62-4 of the distance sensor 62-5 and the surface of the target object 211 overlap with each other. Then, on the surface of the target object 211, a range surrounded by a measurement area V62-1 (not illustrated) of the distance sensor 62-1 to a measurement area V62-8 (not illustrated) of the distance sensor 62-8 is the measurement area of the distance sensor array SA.

As illustrated in this drawing, the measurement area A61 of the depth camera 61 becomes narrower as the distance to the target object 211 becomes shorter. For example, in FIG. 7B, the measurement area A61 is very narrow. In addition, since distances to many measurement points are measured in the narrow measurement area A61, it is very inefficient.

On the other hand, since each distance sensor 62 is arranged around the depth camera 61, the measurement area of the distance sensor array SA becomes wider than the measurement area A61 of the depth camera 61 as each distance sensor approaches the target object 211, and the difference increases as each distance sensor approaches the target object 211.

In addition, when the measurement area becomes narrower, a measurement error of the inclination of the target object increases.

Figure 8:
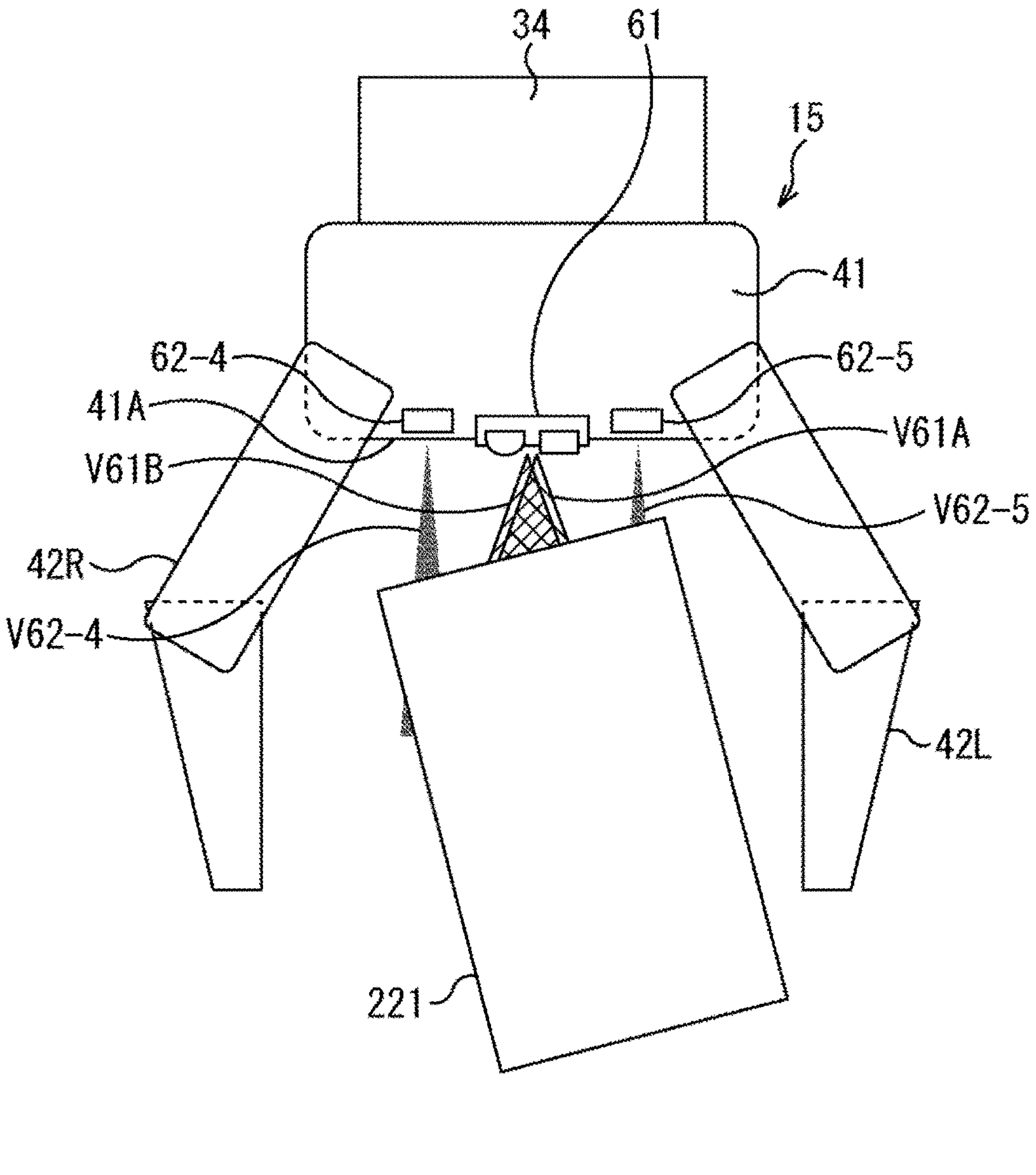
FIG. 8 is a diagram for explaining a difference in estimation accuracy of inclination of a target object between a case of using the depth camera and the case of using a distance sensor.

FIG. 8 illustrates an example in which the target object 221 is inclined with respect to the palm 41A of the hand 35. In this case, a measurement error 40 of the inclination of the target object 221 is expressed by the following equation (1).

$$\Delta\theta = \theta t - \theta m \approx \tan(2\Delta d/W) \qquad (1)$$

θt represents a true value of the inclination of the target object 211. θm represents a measurement value of the inclination of the target object 211. Δd represents a measurement error of the distance to the target object. W represents an interval between measurement points of the distance of the target object.

In the case of the example of FIG. 8, when the distance sensor array SA is used, the interval W between the measurement points becomes wider than when the depth camera 61 is used. Therefore, in the case of using the distance sensor array SA, the measurement error Δθ of the inclination of the target object 221 expressed by Formula (1) is smaller than that in the case of using the depth camera 61.

Therefore, in a case where the hand 35 approaches the target object 221, the use of the distance sensor array SA improves the accuracy of alignment of the posture of the hand 35 with respect to the target object 211 as compared with the use of the depth camera 61.

Figure 9B:
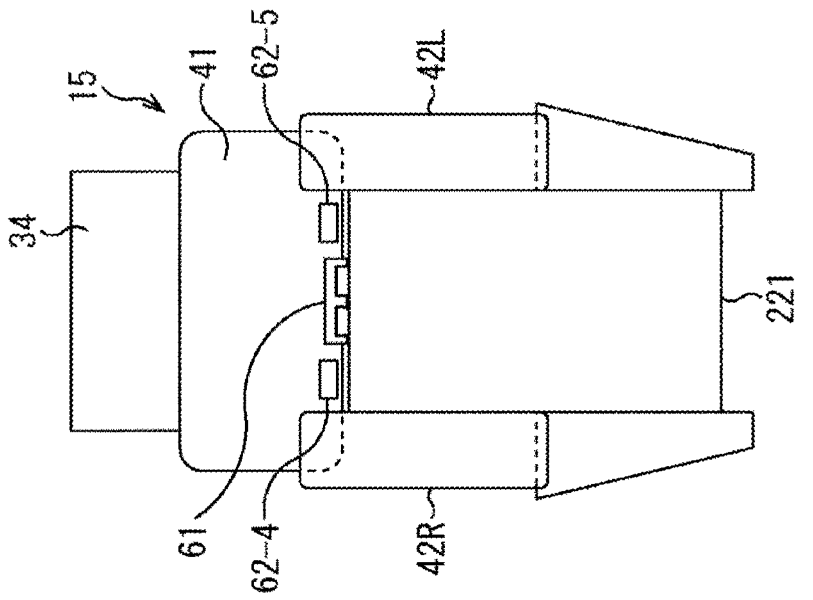
FIGS. 9A and 9B are diagrams illustrating an example in which a state in which a target object is gripped is compared between a case where the posture of the hand is shifted with respect to the target object and a case where the posture of the hand is matched with the posture of the hand.
Figure 9A:
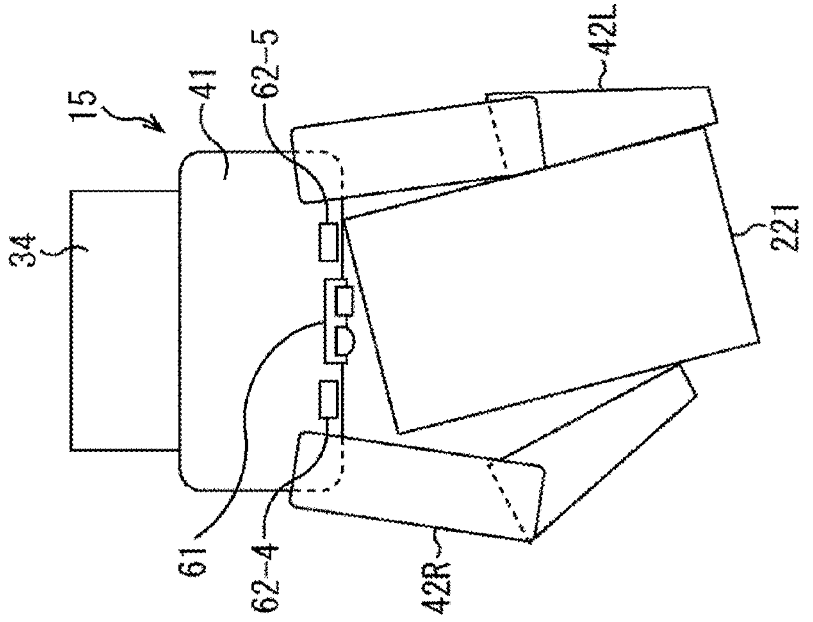

FIGS. 9A and 9B illustrate an example in which a state in which the hand 35 grips the target object 211 is compared between a case where the posture of the hand 35 is shifted with respect to the target object 211 and a case where the posture of the hand 35 is matched with the target object 211. FIG. 9A illustrates an example of the case in which the posture of the hand 35 is shifted with respect to the target object 221. FIG. 9B illustrates an example of the case in which the posture of the hand 35 is matched with the target object 221.

In a case where the posture of the hand 35 is shifted with respect to the target object 221, the contact area between the hand 35 and the target object 221 decreases. As a result, the target object 221 becomes unstable in the state of being gripped by the hand 35, and the possibility that the target object 221 falls increases.

On the other hand, in a case where the posture of the hand 35 is matched with the target object 221, the contact area between the hand 35 and the target object 221 increases. As a result, the target object 221 is stabilized in the state of being gripped by the hand 35, and the possibility that the target object 221 falls decreases.

Therefore, since the accuracy of alignment of the posture of the hand 35 with respect to the target object 211 is improved by using the distance sensor 62, the possibility that the hand 15 succeeds in gripping the target object 221 increases.

In addition, as the robot hand approaches the target object, an allowable error in the position of the target object decreases, and thus, in a general robot hand, a speed at which the robot hand approaches the target object is reduced in order to improve accuracy of positioning control.

On the other hand, in the present technology, in a case where the target object approaches, the sensor is switched, so that the processing of measuring the distance to the target object is speeded up, and the feedback control of positioning can be speeded up. Accordingly, it is possible to cause the hand 35 to approach the target object at a high speed without lowering the accuracy of the positioning control.

As described above, even when the hand approaches the target object, it is possible to detect the distance distribution to the target object with high accuracy in a wide range of the target object. As a result, it is possible to execute feedback control of positioning until immediately before the target object comes into contact. As a result, the hand 35 is prevented from colliding with the target object or tilting the target object, and the success rate of the gripping of the target object is improved.

Note that, in a case where the distance to the target object is long, the positioning control can be executed only by the depth camera 61 without using the distance sensor 62.

However, for example, in a case where the target object moves (for example, a case where a target object is placed on a belt conveyor or is delivered) even if the distance to the target object is long, it is desirable to execute the positioning control until immediately before gripping the target object.

In addition, for example, even if the distance to the target object is long, in a case where the shape and the position of the target object cannot be accurately gripped until the hand approaches the target object (for example, a case of gripping a target object in a high shelf, or the like), it is difficult to execute positioning control in a state of being away from the target object.

Therefore, even if the distance to the target object is long, it is desirable to execute positioning control using the distance sensor 62.

As described above, the accuracy and speed of the positioning control of the hand 15 are improved. As a result, the target object can be quickly and stably gripped. In other words, collision with the target object or failure in gripping the target object at the time of approaching the target object is suppressed, and the success rate of gripping the target object is improved.

In addition, in both the case of using the depth camera 61 and the case of using the distance sensor array SA, the positioning control is executed on the basis of the distance distribution of the plurality of measurement points. Therefore, a similar positioning control method can be adopted in both cases. This enables a smooth approach without significantly changing the motion of the hand 35 when the sensor is switched. In addition, the control amount calculation unit 116 can be made common, and the configuration of the control unit 101 can be simplified.

Furthermore, it is not necessary to calibrate the depth camera 61 and the distance sensor 62 individually, and calibration can be performed in parallel in a state of being incorporated in the hand 35. As a result, the time required for calibration can be shortened.

Furthermore, by switching the sensor to be used and stopping one of the sensors, interference between the depth camera 61 and the distance sensor 62 can be prevented. Furthermore, power saving of the robot 1 is realized.

2. Modifications

Hereinafter, modifications of the above-described embodiment of the present technology will be described.

Modification Regarding Sensor Arrangement

The depth camera does not necessarily need to be positioned at the center of the palm of the hand.

Figure 10:
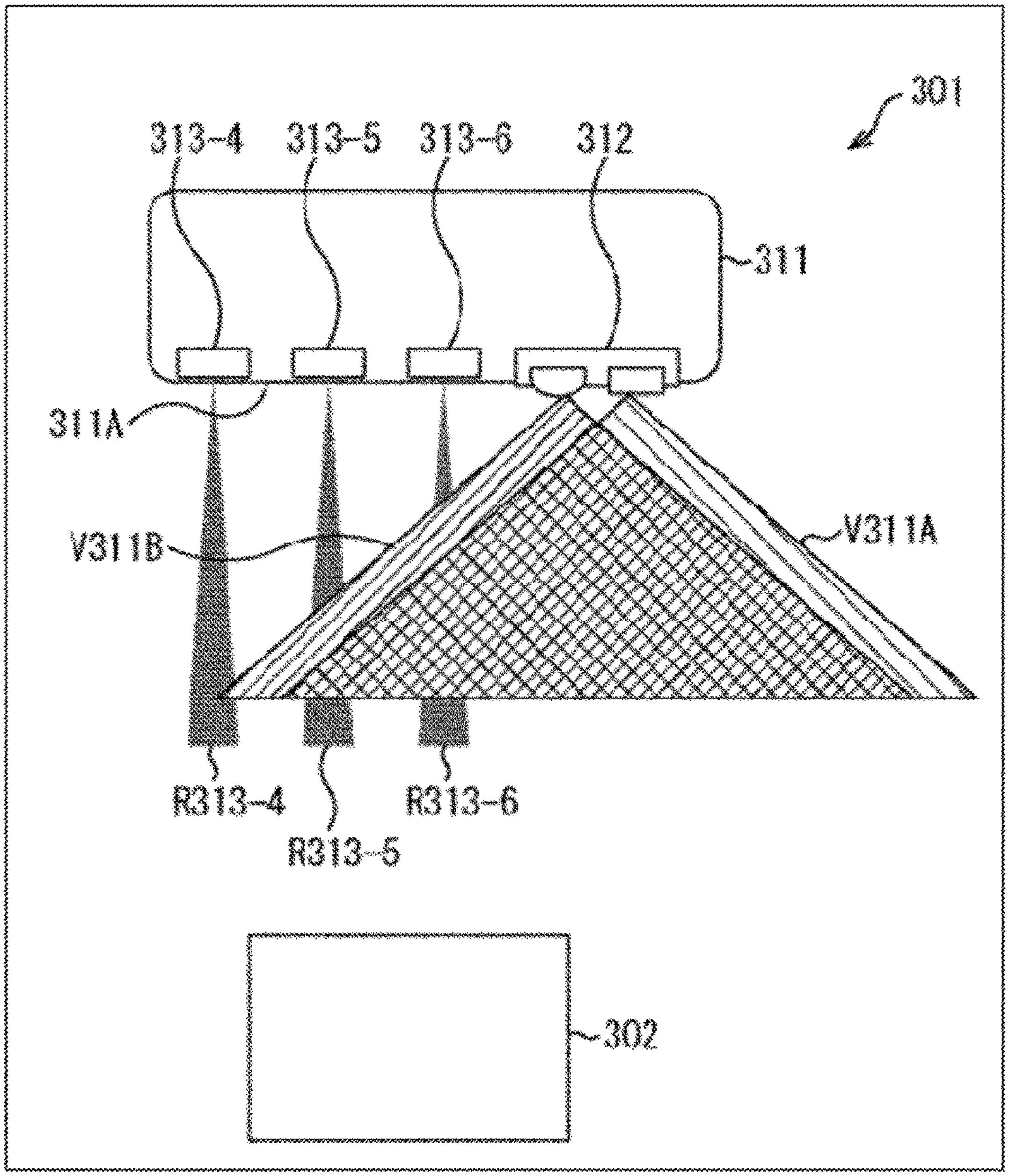
FIG. 10 is a diagram illustrating a modification of the hand of the robot.

For example, FIG. 10 illustrates an arrangement example of each sensor of a hand 301. Note that, in this drawing, illustration of portions other than a base portion 311 of the hand 301 is omitted for easy understanding of the drawing.

For example, a depth camera 312 and distance sensors 313-1 to 313-9 are arranged on a palm 311A of the hand 301. Note that, in this drawing, only the distance sensor 313-4 to the distance sensor 313-6 are illustrated.

The depth camera 312 is arranged at the left end of the palm 311A.

The distance sensors 313-1 to 313-9 are arranged on the right side of the depth camera 312 in the drawing in the palm 311A. The distance sensors 313-1 to 313-9 are arranged in a 3×3 array, for example.

Furthermore, depending on the size of the depth camera 61, a case is assumed in which the depth camera 61 cannot be arranged on the palm 41A. In this case, the depth camera 61 may be arranged at a position away from the palm 41A. Then, for example, the distance sensor 62 may be additionally arranged in an empty space of the palm 41A.

For example, the depth camera 61 and the distance sensor 62 may be arranged on the finger 42. In this case, when the finger 42 comes into contact with the target object, the relative posture and position of the finger 42 and the target object can be adjusted.

Modification Regarding Type of Sensor

For example, a depth camera of a method other than the ToF method can be used as the depth camera 61. For example, a depth camera such as a stereo camera method or a structured light method can be used as the depth camera 61.

Furthermore, for example, a sensor capable of acquiring three-dimensional information using a three-dimensional measurement method other than a camera such as a radar or an ultrasonic phased array may be used instead of the depth camera 61.

For example, a distance sensor of a method other than the ToF method can be used for the distance sensor 62. For example, a distance sensor of a method such as a photo-reflector, an ultrasonic wave, or a laser can be used as the distance sensor 62.

For example, in a case where the depth camera 61 and the distance sensor 62 have the same method (for example, a ToF method, an ultrasonic method, or the like), the transmission elements can be made common. In a case where the transmission elements are made common, interference of transmission signals does not occur, and thus, it is possible to simultaneously perform measurement of the depth camera 61 and the distance sensor 62.

Furthermore, for example, by using the depth camera 61 and the distance sensor 62 having different wavelengths of transmission signals, is possible to simultaneously perform measurement of the depth camera 61 and the distance sensor 62.

By simultaneously performing measurement of the depth camera 61 and the distance sensor 62, for example, the spatial resolution of the distance in a case of approaching the target object is improved.

Modification Regarding Sampling Rate

For example, the control unit 101 may adjust the sampling rate of the distance sensor 62 on the basis of the distance to the target object.

For example, in a case where the distance to the target object is long, it is sufficient to perform rough positioning, and thus, high speed performance of distance measurement is not much required. On the other hand, when the distance to the target object becomes short, it is necessary to perform fine positioning, and thus, high speed of distance measurement is required.

Therefore, for example, the control unit 101 may lower the sampling rate of the distance sensor 62 in a case where the distance to the object is long, and may increase the sampling rate of the distance sensor 62 as the distance to the object becomes shorter. Accordingly, the positioning of the hand 15 can be executed with high accuracy while suppressing the power consumption of the robot 1.

Other Modifications

The present technology can be applied to all mobile bodies in which at least a part is movable, at least a part is brought close to a target object, and positioning control is executed on the target object, in addition to the mobile body that grips the target object described above.

For example, the present technology can be applied to a robot hand that holds a target object by suction.

For example, the present technology can be applied to a case where a mobile body such as a robot or a bogie is brought close to a target object such as a wall and stopped in the vicinity of the target object.

3. Others

Configuration Example of Computer

The above-described series of processing can be performed by hardware or software. In a case where the series of processing is performed by software, a program constituting the software is installed in a computer. Here, the computer includes, a computer incorporated in dedicated hardware and a general-purpose personal computer capable of executing various kinds of functions by installing various programs, for example.

Figure 11:
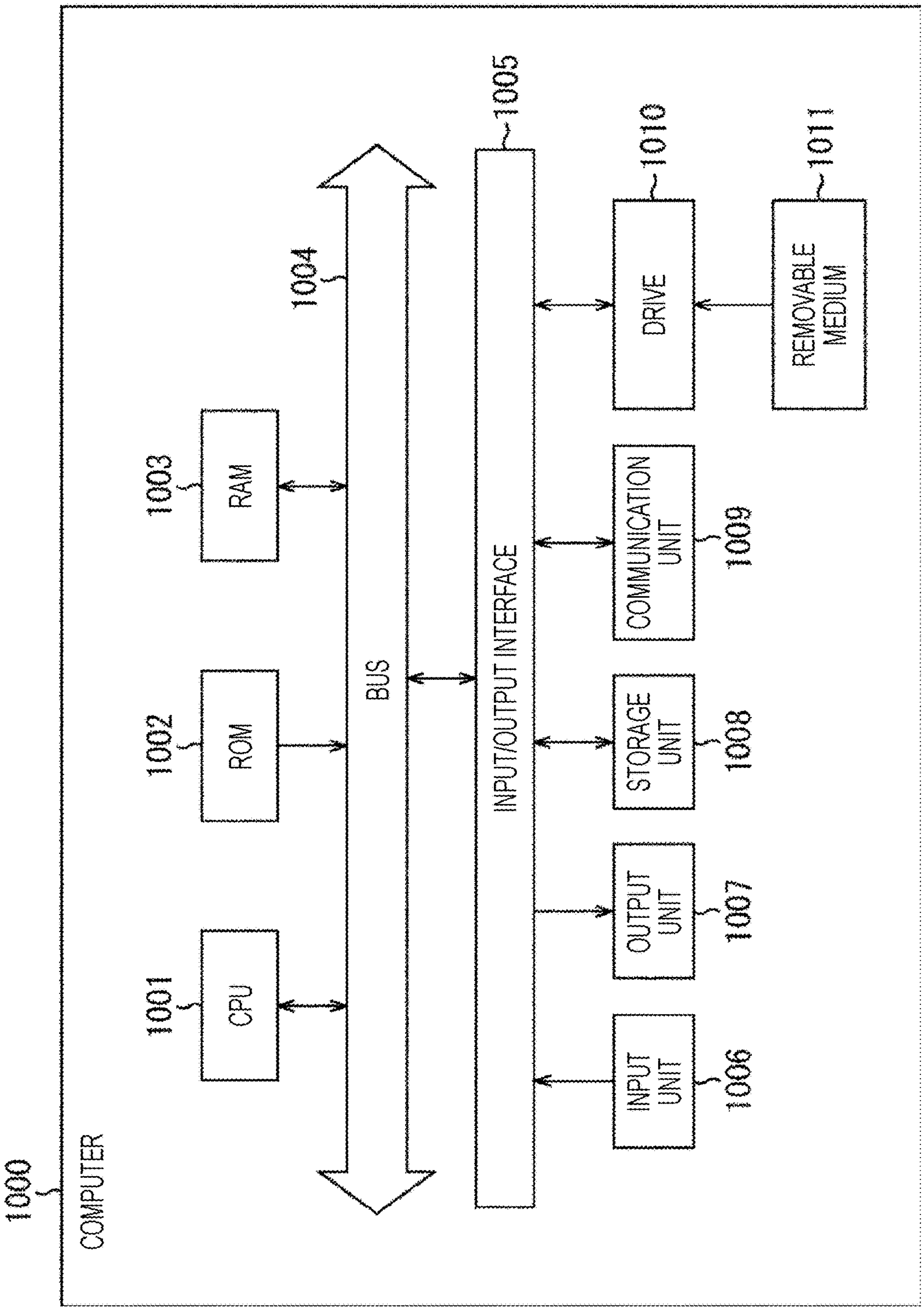
FIG. 11 is a block diagram illustrating a configuration example of a computer.

FIG. 11 is a block diagram illustrating a configuration example of the hardware of the computer that executes the above-described series of processing with a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a storage unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The storage unit 1008 includes a hard disk, a non-volatile memory, and the like. The communication unit 1009 includes a network interface or the like. The drive 1010 drives a removable medium 1011 such as a magnetic disk, an optical disc, a magneto-optical disk, or a semiconductor memory.

In the computer 1000 configured as described above, the series of processing described above is performed, for example, by the CPU 1001 loading a program stored in the storage unit 1008 into the RAM 1003 via the input/output interface 1005 and the bus 1004, and executing.

The program executed by the computer 1000 (CPU 1001) can be provided by being recorded in the removable medium 1011 as a package medium or the like, for example. Furthermore, the program can be provided via a wired or wireless transmission medium such as a local area network, the Internet, or digital satellite broadcasting.

In the computer 1000, by attaching the removable medium 1011 to the drive 1010, the program can be installed in the storage unit 1008 via the input/output interface 1005. Furthermore, the program can be received by the communication unit 1009 via a wired or wireless transmission medium, and installed in the storage unit 1008. In addition, the program can be installed in the ROM 1002 or the storage unit 1008 in advance.

Note that, the program executed by the computer may be a program that is processed in time series in an order described in this specification, or a program that is processed in parallel or at a necessary timing such as when a call is made.

Furthermore, in the present specification, a system is intended to mean assembly of a plurality of components (devices, modules (parts), and the like) and it does not matter whether or not all the components are in the same casing. Therefore, a plurality of devices housed in separate housings and coupled via a network and one device in which a plurality of modules is housed in one housing are both systems.

Moreover, the embodiment of the present technology is not limited to the above-described embodiment, and various modifications can be made without departing from the gist of the present technology.

For example, the present technology may be configured as cloud computing in which a function is shared by a plurality of devices via the network to processing together.

Furthermore, each step described in the above flowchart may be executed by one device or shared and executed by a plurality of devices.

Moreover, in a case where a plurality of processing is included in one step, the plurality of processing included in the one step can be executed by one device or shared and executed by a plurality of devices.

Examples of Configuration Combinations

The present technology can also be configured as follows.

(1)

A mobile body including:

a first sensor capable of measuring three-dimensional information;

a second sensor capable of measuring a distance, the second sensor having a minimum measurement distance smaller than a minimum measurement distance of the first sensor, and having a visual field overlapping with a visual field of the first sensor; and a control unit that executes positioning control for an object by switching a sensor to be used among the first sensor and the second sensor on the basis of a distance to the object.

(2)

The mobile body according to (1), in which the control unit switches a sensor to be used from the first sensor to the second sensor in a case where a distance to the object measured by the first sensor is equal to or less than a first threshold.

(3)

The mobile body according to (2), in which the first threshold is set to a distance within a range in which a measurement range of the first sensor and a measurement range of the second sensor overlap with each other.

(4)

The mobile body according to (3), further including a plurality of the second sensors, in which the first threshold is set to a distance at which a size of a measurement area of the plurality of second sensors is equal to or larger than a size of a measurement area of the first sensor.

(5)

The mobile body according to any one of (2) to (4), in which the control unit stops the first sensor and activates the second sensor in a case where the distance to the object measured by the first sensor is equal to or less than the first threshold.

(6)

The mobile body according to any one of (2) to (5), in which the control unit increases a sampling rate of the second sensor as the distance to the object decreases.

(7)

The mobile body according to any one of (2) to (6), in which the control unit switches a sensor to be used from the second sensor to the first sensor in a case where a distance to the object measured by the second sensor is equal to or more than a second threshold.

(8)

The mobile body according to (7), in which the control unit stops the second sensor and activates the first sensor in a case where the distance to the object measured by the second sensor is equal to or more than the second threshold.

(9)

The mobile body according to any one of (1) to (8), further including a hand configured to grip the object, in which the first sensor and the second sensor are provided to the hand, and the control unit executes positioning control of the hand with respect to the object.

(10)

The mobile body according to (9), in which the hand includes:

a palm; and at least two fingers connected to the palm, and the first sensor and the second sensor are arranged on the palm.

(11)

The mobile body according to (10), further including a plurality of the second sensors, in which the plurality of second sensors is arranged to surround a periphery of the first sensor.

(12)

The mobile body according to any one of (9) to (11), further including a plurality of the second sensors, in which the control unit adjusts a posture and a position of the hand with respect to the object on the basis of a distance distribution measured by the first sensor or distance distributions measured by the plurality of second sensors, and causes the hand to approach the object.

(13)

The mobile body according to (12), in which the control unit adjusts the posture and the position of the hand with respect to the object by the same control method in a case where the first sensor is used and in a case where the second sensor is used.

(14)

The mobile body according to (13), in which the control unit executes calibration of the first sensor and calibration of the second sensor in parallel.

(15)

The mobile body according to any one of (1) to (14), further including a plurality of the second sensors, in which the first sensor and the plurality of second sensors can measure distances in the same direction.

(16)

The mobile body according to (15), in which the plurality of second sensors is arranged to surround a periphery of the first sensor.

(17)

The mobile body according to any one of (1) to (16), in which the first sensor is a depth camera, and the second sensor is a distance sensor.

(18)

A positioning control method including by a mobile body including a first sensor capable of measuring three-dimensional information, and a second sensor capable of measuring a distance, the second sensor having a minimum measurement distance smaller than a minimum measurement distance of the first sensor, and having a visual field overlapping with a visual field of the first sensor, executing positioning control for an object by switching a sensor to be used among the first sensor and the second sensor on the basis of a distance to the object.

Note that the effects described herein are merely examples and are not limited, and other effects may be provided.

REFERENCE SIGNS LIST

1 Robot

14L, 14R Arm

15L, 15R Hand
18 RGB-D camera
31L, 31R Joint
32L, 32R Link
33L, 33R Joint
34L, 34R Link
41L, 41R Base portion
41A Palm
42LL, 42LR, 42LR, 42RR Finger
51L, 51R Joint
52L, 52R Link
53L, 53R Joint
54L, 54R Link
61 Depth camera
62-1 to 62-8 Distance sensor
111 Object measurement unit
112 Control amount calculation unit
113, 114 Preprocessing unit
115 Switch
116 Control amount calculation unit
117 Controller
118 Sensor switching unit
301 Hand
311 Base portion
311A Palm
312 Depth camera
313-1 to 313-9 Distance sensor

The invention claimed is:

1. A mobile body, comprising:
a first sensor configured to measure three-dimensional information associated with an object;
a plurality of second sensors, wherein
the plurality of second sensors includes a third sensor configured to measure a distance from a part of the mobile body to the object, wherein
a first minimum measurement distance of the first sensor is greater than a second minimum measurement distance of the third, and
a first visual field of view of the first sensor overlaps with a second visual field of view of the third sensor; and
a central processing unit (CPU) configured to:
acquire first distance data from the first sensor, wherein the first distance data is associated with the distance from the part of the mobile body to the object;
determine, based on the first distance data, that the distance from the part of the mobile body to the object is one of equal to or less than a first threshold, wherein
the first threshold is a threshold distance at which a second area associated with the plurality of second sensors is one of equal to or larger than a first area associated with the first sensor
the first area indicates a range in which an irradiation region of a light emitting element of the first sensor overlaps with the first visual field of view of the first sensor on a surface of the object,
the second area indicates a range that surrounds a third area associated with the third sensor and a fourth area associated with a fourth sensor of the plurality of second sensors,
the third area indicates a range in which the second visual field of view of the third sensor overlaps with the surface of the object,
the fourth area indicates a range in which a third visual field of view of the fourth sensor overlaps with the surface of the object,
the threshold distance is within a specific range, and
a measurement range of the first sensor overlaps with a measurement range of the third sensor in the specific range;
switch from the first sensor to the third sensor based on the determination that the distance from the part of the mobile body to the object is one of equal to or less than the first threshold;
acquire second distance data from the third sensor based on the switch from the first sensor to the third sensor, wherein the second distance data is associated with the distance from the part of the mobile body to the object; and
control the mobile body based on the second distance data.

2. The mobile body according to claim 1, wherein
the CPU is further configured to:
stop the first sensor; and
activate the third sensor, and
the first sensor is stopped and the third sensor is activated based on the determination that the distance from the part of the mobile body to the object is one of equal to or less than the first threshold.

3. The mobile body according to claim 1, wherein the CPU is further configured to increase a sampling rate of the third sensor based on a decrease in the distance from the part of the mobile body to the object.

4. The mobile body according to claim 1, wherein
the CPU is further configured to switch from the third sensor to the first sensor based on the second distance data, and
the second distance data indicates that the distance from the part of the mobile body to the object is one of equal to or more than a second threshold.

5. The mobile body according to claim 4, wherein
the CPU is further configured to:
stop the third sensor; and
activate the first sensor, and
the third sensor is stopped and the first sensor is activated based on the distance from the part of the mobile body to the object that is one of equal to or more than the second threshold.

6. The mobile body according to claim 1, further comprising a hand configured to grip the object, wherein
the first sensor and the third sensor are in the hand, and
the CPU is further configured to control the hand based on a position of the object with respect to the hand.

7. The mobile body according to claim 6, wherein the hand includes:
a palm; and
at least two fingers connected to the palm, wherein the first sensor and the third sensor are on the palm.

8. The mobile body according to claim 7, wherein the plurality of second sensors is at a plurality of locations within a vicinity of a periphery of the first sensor.

9. The mobile body according to claim 6, wherein the CPU is further configured to:
adjust each of a posture and a position of the hand with respect to the object based on one of the first distance data or the second distance data; and
control the hand, to approach the object, based on the adjustment of each of the posture and the position of the hand.

10. The mobile body according to claim 9, wherein
the CPU is further configured to adjust each of the posture and the position of the hand with respect to the object by a control method, and the control method is the same for both the first sensor and the third sensor.

11. The mobile body according to claim 10, wherein the CPU is further configured to execute a calibration of the first sensor and a calibration of the third sensor in parallel.

12. The mobile body according to claim 1, a direction of measurement of the distance by the first sensor is the same as a direction of measurement of the distance by each of the plurality of second sensors.

13. The mobile body according to claim 12, wherein the plurality of second sensors is at a plurality of locations within a vicinity of a periphery of the first sensor.

14. The mobile body according to claim 1, wherein the first sensor is a depth camera, and the third sensor is a distance sensor.

15. A positioning control method executed by a mobile body including a first sensor and a plurality of second sensors, the positioning control method comprising:

measuring, by the first sensor, three-dimensional information associated with an object;

measuring, by a third the sensor of the plurality of second sensors, a distance from a part of the mobile body to the object, wherein a first minimum measurement distance of the first sensor is greater than a second minimum measurement distance of the third sensor, and a first visual field of view of the first sensor overlaps with a second visual field of view of the third sensor;

acquiring first distance data from the first sensor, wherein the first distance data is associated with the distance from the part of the mobile body to the object;

determining, based on the first distance data, that the distance from the part of the mobile body to the object is one of equal to or less than a first threshold, wherein the first threshold is a threshold distance at which a second area associated with the plurality of second sensors is one of equal to or larger than a first area associated with the first sensor, the first area indicates a range in which an irradiation region of a light emitting element of the first sensor overlaps with the first visual field of view of the first sensor on a surface of the object, the second area indicates a range that surrounds a third area associated with the third sensor and a fourth area associated with a fourth sensor of the plurality of second sensors, the third area indicates a range in which the second visual field of view of the third sensor overlaps with the surface of the object, the fourth area indicates a range in which a third visual field of view of the fourth sensor overlaps with the surface of the object, the threshold distance is within a specific range, and a measurement range of the first sensor overlaps with a measurement range of the third sensor in the specific range;

switching from the first sensor and the third sensor based on the determination that the distance from the part of the mobile body to the object is one of equal to or less than the first threshold;

acquiring second distance data from the third sensor based on the switch from the first sensor to the third sensor, wherein the second distance data is associated with the distance from the part of the mobile body to the object; and controlling the mobile body based on the second distance data.

* * * * *